S. A. BROWN.
WATER GAGE.
APPLICATION FILED MAY 15, 1918.
1,359,958. Patented Nov. 23, 1920.
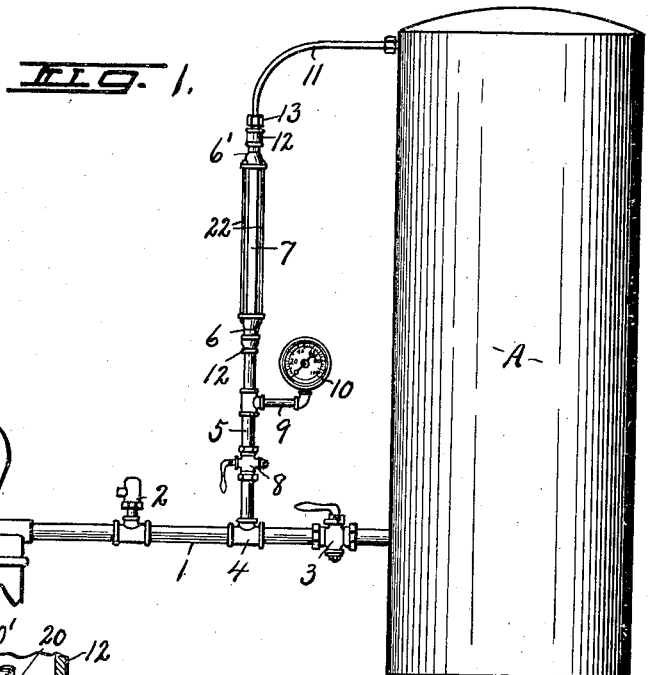
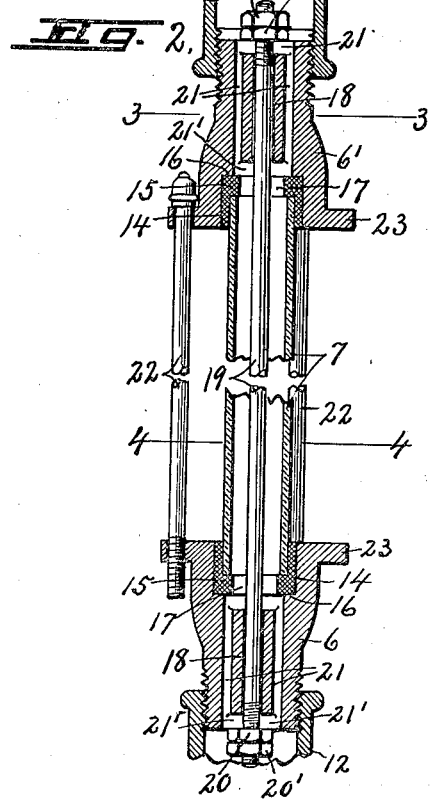
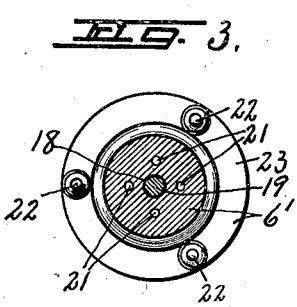
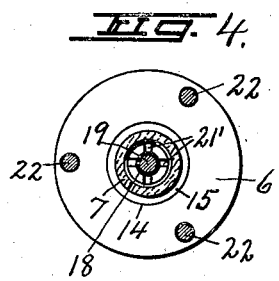
INVENTOR
S. A. Brown
BY
Howard P. Denton
ATTORNEY.

UNITED STATES PATENT OFFICE.

STEFFEN A. BROWN, OF NEW YORK, N. Y.

WATER-GAGE.

1,359,958.　　　Specification of Letters Patent.　　Patented Nov. 23, 1920.

Application filed May 15, 1918. Serial No. 234,714.

*To all whom it may concern:*

Be it known that I, STEFFEN A. BROWN, a citizen of the United States of America, and resident of New York city, in the county of New York, in the State of New York, have invented new and useful Improvements in Water-Gages, of which the following, taken in connection with the accompanying drawings, is a full, clear, and exact description.

This invention relates to certain improvements in water gages involving the use of a vertically disposed glass tube and suitable connections between the opposite ends thereof and the liquid containing chamber at points below and above the level of the liquid therein so as to visually indicate said level.

The ends of the glass tubes of water gages of this character are usually secured in stuffing boxes having adjustable threaded glands for tightening the packings to prevent the passage of air or liquid through the joints and in most instances the fixtures for supporting the ends of the tube are rigidly secured directly to the liquid container which makes it exceedingly difficult to bring the stuffing boxes into proper co-axial alinement and frequently results in the breaking of the glass tube during the adjustment of the glands or in failure to secure an air and liquid tight joint.

The main object of my present invention is to avoid these objectionable results by enabling the fixtures to automatically adjust themselves into exact co-axial alinement while being clamped to the ends of the glass tube and also by clamping said fixtures upon the ends of the tube by means of a single tie-bolt passing centrally through said tube.

Other objects and uses relating to specific parts of the gage will be brought out in the following description.

In the drawings—

Figure —1— is a side elevation of my improved gage and water tank to which it is connected showing also a portion of a pump for supplying liquid to the tank under pressure.

Fig. —2— is an enlarged longitudinal vertical sectional view of the water gage partly broken away.

Figs. —3— and —4— are transverse sectional views taken respectively in the planes of lines 3—3 and 4—4 Fig. —2—.

In order that my invention may be clearly understood I have shown a water-containing tank or reservoir —A— to which water may be supplied under pressure by a pump —B— through a pipe —1— having a pressure regulator —2— and a normally open valve —3— together with T-fitting —4—, the regulator —2— being located between the pump —B— and pipe fitting —4— while the valve —3— is located between the pipe fitting and tank to enable the water to be shut off when desired for repairs or other purposes.

A vertical pipe —5— is secured at its lower end to the fitting —4— and carries at its upper end a gage fitting or lower head —6— for receiving and supporting the lower end of a glass gage tube —7—, said pipe —5— being provided with a valve —8— and a lateral branch pipe —9— communicating with pressure gage —10—.

A relatively small pipe —11— of copper or other easily bendable metal is secured at one end to the upper portion of the tank —A— to communicate with the interior thereof, the other end of said pipe being secured to an upper gage fixture or head —6'— which receives the upper end of the gage-tube —7—.

The end heads or gage fixtures —6— and —6'— are substantially identical in construction and are interchangeable, both heads being provided with reduced externally threaded ends for receiving internally threaded couplings —12— by which they are connected respectively to the pipes —5— and —11—.

The upper coupling —12— is provided with a reducing nipple —13— by which it is connected to the adjacent end of the pipe —11—.

Each of the heads —6— and —6'— is provided with a socket —14— in which is seated a rubber or equivalent gasket —15— for receiving the adjacent end of the gage-tube —7—, said gasket being fitted snugly in the socket —14— and around the adjacent end of the tube —7— and is seated upon or against an annular shoulder —16— at the base of the socket, said gasket being provided with an annular shoulder against which the end of the tube —7— rests and is also provided with a central opening —17— for establishing communication between the interiors of the head and gage-tube.

These heads —6— and —6'— are provided with central co-axial bolt openings —18— for receiving the opposite ends of a clamping bolt —19— which extends centrally through the gage-tube —7— as shown more clearly in Fig. —2— and has its opposite ends provided with threads of opposite pitch for receiving nuts —20— engaging the outer ends of the heads for tightening the latter upon the ends of the gage-tube.

Suitable lock nuts —20'— are also engaged with opposite ends of the bolt —19— to prevent loosening of the clamping nuts —20—.

Each of the heads —6— and —6'— is also provided with a plurality of lengthwise passages —21— arranged symmetrically around the central bolt opening —18— and terminating at both ends in radial branch passages —21'— for establishing communication between the interior of the adjacent coupling —12— and gage-tube —7—.

Suitable fender rods —22— may be passed through apertured flanges —23— on the adjacent ends of the heads —6— and —6'— to protect the glass tube against breakage and to hold the heads against relative turning movement as they are tightened and released upon and from the ends of the tube.

It is now clear that by passing the clamping bolt —19— centrally and axially through the heads —6— and —6'— and gage-tube —7— permits said heads to be clamped to the ends of the tube with uniform pressure entirely around the axis thereof in a single operation thereby reducing to a minimum the liability of breaking the tube and at the same time assures a liquid tight and air tight joint between each head and adjacent end of the tube and also avoids the use of the more or less troublesome and expensive stuffing boxes. The light, bendable tube —11— serves to permit the head —6'— to be easily brought into co-axial alinement with the gage-tube and lower head and to automatically adjust itself to such alinement as the heads are drawn together upon opposite ends of the gage-tube by the clamping bolt —19— when necessary.

If desired the fender rods —22— may be threaded and engaged in threaded apertures in one of the heads as —6— to be used with or independently of the central tie rod —19— for clamping said heads upon the adjacent end of the gage tube as shown in Fig. —2—.

What I claim is:

1. In a water-gage, the combination of a gage-tube, clamping heads engaging opposite ends of said tube and provided with internal glands therefor, and a clamping bolt engaging the end heads and extending through the tube for clamping the head and tube together, said heads having lengthwise passages therethrough communicating with the interior of the tube.

2. In a water gage, the combination of end heads having bolt openings and co-axial sockets in their adjacent ends, gaskets seated in said sockets, a gage tube having its ends seated against said gaskets and a clamping bolt passed centrally through the tube and engaged with both heads, said heads having lengthwise passages therethrough around the bolt openings and communicating with the tube through the gaskets.

In witness whereof I have hereunto set my hand this 9th day of May, 1918.

STEFFEN A. BROWN.

Witnesses:
L. RICHARDSON,
E. GEBHARDT.